United States Patent [19]
Brems

[11] 3,731,046
[45] May 1, 1973

[54] ELECTRODE ROD HOLDER FOR RESISTANCE WELDING ACTUATORS

[76] Inventor: John Henry Brems, 32867 White Oaks Trail, Birmingham, Mich. 48010

[22] Filed: Oct. 26, 1971

[21] Appl. No.: 192,544

[52] U.S. Cl. .....................219/78, 219/89, 219/119
[51] Int. Cl. .............................................B23k 11/10
[58] Field of Search...........................219/119, 89, 78

[56] References Cited

UNITED STATES PATENTS

| | | |
|---|---|---|
| 3,493,717 | 2/1970 | Sciaky..............................219/119 X |
| 3,558,848 | 1/1971 | Width..............................219/119 X |
| 3,632,958 | 1/1972 | Width..............................219/119 X |
| 3,573,423 | 4/1971 | Medlin...............................219/119 |

Primary Examiner—J. V. Truhe
Assistant Examiner—B. A. Reynolds
Attorney—Arthur Raisch et al.

[57] ABSTRACT

An electrode rod holder for resistance welding to serve as an insulator for the welding current and also to produce a follow-up motion to maintain necessary pressure on the parts throughout the entire weld period which includes a holding member and resilient mounts which insulate and also preload the rod holder in an axial bias to produce follow-up pressure and motion.

4 Claims, 1 Drawing Figure

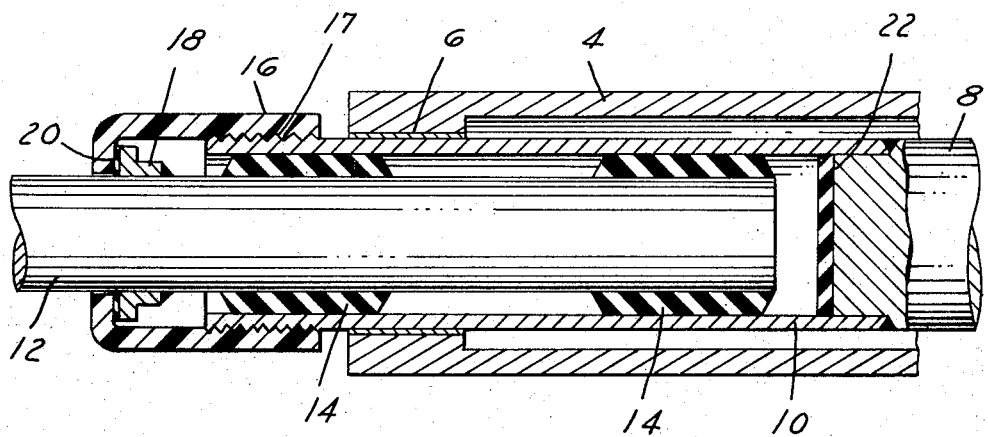

[3,731,046]

ELECTRODE ROD HOLDER FOR RESISTANCE WELDING ACTUATORS

This invention relates to an Electrode Rod Holder for Resistance Welding Actuators.

It is an object of this invention to provide a means of electrically insulating the output rod on which the electrode assembly is mounted from the remainder of the actuator assembly. This precludes the requirement for electrical insulation between the output rod and the electrode assembly.

It is a further object of this invention to provide a means of producing a movement follow-up system to the welding electrode which has low inertia and very little friction.

It is a further object of this invention to provide an adjustable preload system for the elastic follow-up device to achieve a relatively flat force distance relationship in the normal working force range without the accompanying disadvantage of an excessively long elastic deflection during every work cycle.

In the field of multiple spot resistance welding, many relatively small air or hydraulic cylinders are used as electrode actuators. The connection between the actuator output rod and the electrode holders must be electrically insulated to prevent damage to the actuators by the voltages applied through suitable cables to these electrode holders from the welding transformers. While the systems in present usage are moderately satisfactory, they are not without their faults, among which are relatively high complexity, requirement of a high degree of maintenance, and exposure to the dirt associated with this type of welding.

As is well known in resistance welding, the force which the electrode applies to the workpiece, during and for a short time after the welding current passes through the weld area, is important to the quality of the weld. Furthermore, in most such welds, the heating, partial melting, and subsequent cooling of the metal between the electrodes causes a slight decrease of the workpiece thickness under the electrode. Therefore, the electrode must move through some small distance in maintaining the required force; this movement is termed follow-up and is exceedingly important to maintain weld quality. For a typical weld of moderate thickness sheet metal, this slight follow-up movement must occur within a time whose order of magnitude is approximately 1/20 second. It is easily seen, therefore, that any friction or high inertia in the output system of the electrode actuator exerts a negative influence on the maintenance of the proper force during the follow-up period.

It is the purpose of the invention disclosed herein to eliminate the friction, reduce the mass to be moved during follow-up and simultaneously eliminate the requirement for external insulation between the electrode and the actuator output rod.

Other objects and features of the invention relating to details of construction and operation will apparent in the following description and claims.

A drawing accompanies this disclosure and the view thereof may be briefly described as a longitudinal midplane cross-section of the device.

REFERRING TO THE DRAWING

The actuator proper may be an air or hydraulic cylinder or equivalent, which may also be supplemented with a force multiplication device which is the subject of a separate disclosure in my copending application, Ser. No. 194,928, filed Nov. 2, 1971. The output end of the actuator case or frame 4 terminates in a guide bearing 6 in a conventional manner. The primary output rod 8 from the actuator is terminated within the frame of the actuator and an output sleeve 10 welded thereto. In some cases it may be equally desirable to drill or bore out the end of the output rod 8 to eliminate the weld joint, but the construction shown is slightly less expensive. A secondary output rod 12 is mounted within this sleeve 10 through two elastic bushings 14 bonded on the inner diameter to rod 12 and on the outer diameter to sleeve 10. These bushings 14 deflect in shear along the axis of motion when an axial load is applied.

These elastic bushings 14 provide the elastic coupling between the secondary output rod 12 and the output sleeve 10. They further provide the electrical insulation between the secondary output rod 12 and the remainder of the actuator assembly. The spring rate of this system may be controlled by the geometry of the elastic bushings 14 and also by their composition. Urethanes, neoprene, and other comparable elastomers are suitable for employment in this application. These materials also have a specific resistivity and dielectric strength which is more than ample for the voltage encountered in resistance welding.

A preload sleeve 16 is screwed to the output sleeve 10 with an interference fit thread 17 which permits suitable axial adjustment. This preload sleeve 16 is made of an essentially rigid type of insulating material; polycarbonate plastic or a rigid fiber glass reinforced urethane are suitable. A metal preload flange 18 is welded to the secondary output rod 12 and bears against the inside of the preload sleeve 16 through an elastic washer 20. It is the purpose of this preload assembly to deflect the elastic bushings 14 with a force slightly less than the working force to minimize the dynamic excursion of the system.

The electrode assembly may be connected directly to the outboard end of the secondary output rod 12 without the addition of insulating members. The rod may be terminated in a variety of ways including flange, taper, reverse taper, or other suitable configuration.

An insulating washer 22 of any suitable dielectric material such as urethane, reinforced phenolic, or melemine is trapped in the cavity between the primary output rod 8 and the secondary output rod 12. This washer performs no function during normal operation but prevents a short circuit in the event of failure of the elastic bushings 14.

I claim:

1. An electrode rod holder for resistance welding actuators which comprises:
    a. a first extension,
    b. a second extension overlappingly associated with said first extension in spaced relation thereto,
    c. means for connecting one of said extensions to a welding actuator, and
    d. means interposed between said extensions comprising an elastic, electrical insulating material occupying the space between said extensions in at least a portion of the overlap of said extensions and permanently secured over a defined area to the respective facing surfaces of said extensions to provide an elastic shear resistance to an axial force on said extensions and an instantaneous response to a change in said force.

2. An electrode rod holder for resistance welding actuators as defined in claim 1 in which the first extension is a tube connected to a welding actuator, and the second extension is a member within said tube having an outer surface radially spaced from the inner walls of said tube, and the interposed means comprises a ring of elastic material bonded on its inner and outer surfaces respectively to the inner surface of said tube and the outer surface of said member.

3. An electrode rod holder as defined in claim 2 in which means on said tube and on said member are provided to cooperate to exert a preload on said elastic ring.

4. An electrode rod holder for resistance welding actuators which comprises:
  a. a first extension,
  b. a second extension overlappingly associated with said tube extension in spaced relation thereto,
  c. means for connecting one of said extensions to a welding actuator,
  d. means interposed between said extensions comprising an elastic, electrical insulating material occupying the space between said extensions in at least a portion of the overlap of said extensions and attached to the facing surfaces of said extensions to provide an elastic shear resistance to relative axial motion between said extensions,
  e. the first extension being a tube connected to a welding actuator, and the second extension being a member within said tube having an outer surface radially spaced from the inner walls of said tube, and the interposed means comprising a ring of elastic material bonded on its inner and outer surfaces respectively to the inner surface of said tube and the outer surface of said member, and
  f. a preload sleeve formed of insulating material axially, adjustably mounted on said tube at the outer end thereof, having a return flange extending toward said member, and a collar mounted on said member to contact axially said flange to exert a preload on said elastic ring proportional to the axial position of said sleeve.

* * * * *